United States Patent
Paolella et al.

(10) Patent No.: US 9,891,425 B2
(45) Date of Patent: Feb. 13, 2018

(54) COMMUNICATIONS SYSTEM INCLUDING AN OPTICAL FILTER DEVICE AND RELATED METHODS

(71) Applicant: Harris Corporation, Melbourne, FL (US)

(72) Inventors: Arthur C. Paolella, Indian Harbour Beach, FL (US); Erin K. Sharma, Palm Bay, FL (US); Charles F. Middleton, Rockledge, FL (US); Evan L. Atwood, Palm Bay, FL (US); Stephen Rego, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 15/186,753

(22) Filed: Jun. 20, 2016

(65) Prior Publication Data

US 2017/0363858 A1 Dec. 21, 2017

(51) Int. Cl.
| | |
|---|---|
| *H04B 10/00* | (2013.01) |
| *G02B 26/00* | (2006.01) |
| *G02B 6/12* | (2006.01) |
| *G02B 6/42* | (2006.01) |
| *H04B 10/2575* | (2013.01) |
| *H04B 10/25* | (2013.01) |

(52) U.S. Cl.
CPC ....... *G02B 26/001* (2013.01); *G02B 6/12004* (2013.01); *G02B 6/4274* (2013.01); *H04B 10/2575* (2013.01); *G02B 2006/12109* (2013.01); *H04B 10/25* (2013.01)

(58) Field of Classification Search
USPC ..................................................... 398/3, 10
See application file for complete search history.

(56) References Cited

U.S. PATENT DOCUMENTS

| | | | |
|---|---|---|---|
| 6,411,752 B1 * | 6/2002 | Little | G02B 6/12002 385/17 |
| 7,187,862 B2 * | 3/2007 | Mahlab | H04B 10/0771 398/10 |
| 7,409,159 B2 * | 8/2008 | Izadpanah | H04B 10/1149 379/56.1 |
| 7,558,450 B2 | 9/2009 | Khurgin et al. | |
| 8,670,476 B2 | 3/2014 | Goddard et al. | |
| 8,718,421 B2 | 5/2014 | Morton | |

(Continued)

FOREIGN PATENT DOCUMENTS

WO WO 02101421 A2 * 12/2002 ........... G02B 6/2934

OTHER PUBLICATIONS

Venghaus, H., Wavelength Filters in Fibre Optics, 2006, Springer-Verlag Berlin Heiderlberg, pp. 355-367.*
Wang et al., Electrically tunable high Q-factor micro-ring resonator based on blue phase liquid crystal cladding, 2014, OSA, pp. 17776-17781.*

(Continued)

*Primary Examiner* — Ken N Vanderpuye
*Assistant Examiner* — Jai Lee
(74) *Attorney, Agent, or Firm* — Allen, Dyer, Doppelt, & Gilchrist, P.A. Attorneys at Law

(57) ABSTRACT

An optical filter device may include an optical waveguide having an input and an output, and a plurality of first optical resonators optically coupled to the optical waveguide along a length thereof between the input and the output. The optical filter device may further include at least one second optical resonator optically coupled to the plurality of first optical resonators opposite the optical waveguide.

25 Claims, 7 Drawing Sheets

(56) References Cited

U.S. PATENT DOCUMENTS

| | | | | |
|---|---|---|---|---|
| 9,709,737 | B2* | 7/2017 | Ptasinski | G02B 6/125 |
| 2003/0128922 | A1* | 7/2003 | Kolodziejski | B82Y 20/00 385/27 |
| 2005/0025505 | A1* | 2/2005 | Soto | H04B 10/25754 398/214 |
| 2005/0058396 | A1* | 3/2005 | Tormen | G02B 6/12004 385/39 |
| 2005/0175358 | A1* | 8/2005 | Ilchenko | G02F 1/011 398/198 |
| 2006/0153267 | A1* | 7/2006 | Suzuki | G02B 6/12007 372/92 |
| 2008/0056313 | A1* | 3/2008 | Yamazaki | H01S 5/1071 372/28 |
| 2008/0166134 | A1* | 7/2008 | McCallion | G02B 6/12007 398/187 |
| 2008/0193133 | A1* | 8/2008 | Krug | G02B 6/12007 398/83 |
| 2008/0240725 | A1* | 10/2008 | Yokoyama | H04B 10/40 398/139 |
| 2009/0170543 | A1* | 7/2009 | Mostafa | H04W 56/0045 455/502 |
| 2009/0220228 | A1* | 9/2009 | Popovic | G02B 6/12007 398/48 |
| 2009/0232507 | A1* | 9/2009 | Gupta | H04L 27/2096 398/115 |
| 2010/0080560 | A1* | 4/2010 | Mertz | H04B 10/67 398/76 |
| 2013/0016423 | A1* | 1/2013 | Zheng | H01S 5/142 359/344 |
| 2013/0071119 | A1* | 3/2013 | Liu | H04B 10/516 398/65 |
| 2013/0183044 | A1* | 7/2013 | Stone | H04B 10/40 398/139 |
| 2014/0376921 | A1* | 12/2014 | Goutzoulis | H04B 10/90 398/116 |
| 2015/0277053 | A1* | 10/2015 | Zheng | G02B 6/29341 385/31 |
| 2015/0381301 | A1* | 12/2015 | Jeong | G02B 6/29397 398/79 |
| 2016/0094308 | A1* | 3/2016 | Liboiron-Ladouceur | H04J 14/04 398/44 |
| 2016/0209724 | A1* | 7/2016 | Testa | G02F 1/313 |

OTHER PUBLICATIONS

Yanagase et al., Box-like Filter Response by Vertically Series Coupled Microring Resonator Filter, 2001, IEEE, pp. 634-635.*
Wikipedia, Indium tin oxide, Mar. 6, 2015, https://en.wikipedia.org/wiki/indium_tin_oxide.*
Poon et al., Wavelength-Selective Reflector Based on a Circular Array of Coupled Microring Resonators, 2004, IEEE.*
Venghaus, Herbert, Wavelength Filters in Fibre Optics, 2006, Springer-Verlag Berlin Heidelberg, pp. 341-379.*
Chremmos et al. "Reflective Properties of Double-Ring Resonator System Coupled to a Waveguide" IEEE Photonics Technology Letters vol. 17, No. 10. Oct. 2005: pp. 2110-2112.
Poon et al. "Wavelength-Selective Reflector Based on a Circular Array of Coupled Microring Resonators" EEE Photonics Technology Letters vol. 16, No. 5, May 2004: pp. 1331-1333.
Vien Van Dual-Mode Microring Reflection Filters: Journal of Lightwave Technology, vol. 25. No. 10. Oct. 2007; pp. 3142-3150.
Paloczi et al. "Compact Microring-Based Wavelength-Selective Inline Optical Reflector" IEEE Photonics Technology Letters; vol. 17, No. 2, Feb. 2005; pp. 390-392.
Heebner et al. "Distributed and localized feedback in microresonator sequences for linear and nonlinear optics" J. Opt. Soc. Am. B/vol. 21, No. 10/Oct. 2004; pp. 1818-1832.
Otto Schwelb "A decade of progress in microring and microdisk based photoniccircuits: a personal selection" in Lasers and Applications in Science and Engineering (International Society for Optics and Photonics, 2008), p. 68720H-68720H.
Bogaerts et al. "Silicon microring resonators" Laser Photonics Rev. 6, No. 1, 2012; pp. 47-73.
John B. Ness "Alignment of cross-coupled resonator filters using the group delay technique," Microwave and Optical Technology Letters / vol. 18, No. 3, Jun. 20, 1998; pp. 174-179.
Ali et al. "Direct and Cross-Coupled Resonator Filters Using Defected Ground Structure (DGS) Resonators," Microwave Conference, 2005 European, 2 (2014); pp. 4.
Popovic et al. "Experimental demonstration of loop-coupled microring resonators for optimally sharp optical filters," OSA CLEO/QELS (2008); pp. 2.
Luo et al. "Many-element coupled-resonator optical waveguides using gapless-coupled microdisk resonators," Optics Express: vol. 17, No. 26, Dec. 21, 2019; pp. 23617-23628.
Melloni et al. Synthesis of Direct-Coupled-Resonators Bandpass Filters for WDM Systems"Synthesis of Direct-Coupled-Resonators Bandpass Filters for WDM Systems," Journal of Lightwave Technology, vol. 20, No. 2, Feb. 2002; pp. 296-303.

* cited by examiner

COMMUNICATIONS SYSTEM INCLUDING AN OPTICAL FILTER DEVICE AND RELATED METHODS

TECHNICAL FIELD

The present invention relates to communications systems, and more particularly, to electro-optical communications devices and related methods.

BACKGROUND

Analog signal processing is an important part of many modern communications systems, such as satellite systems, for example. A received signal from an antenna may include digital or analog information, and it may ultimately be processed digitally, but unless the signal can be digitized directly (a challenging prospect as the frequency of the signal increases), there may be some amount of analog signal processing required. This may include amplification, filtering, transmission over some distance, distribution to multiple receivers/transmitters, and frequency conversion for up- or down-conversion. RF and microwave components are very mature, and a baseline level of performance has been demonstrated for these processing functions. Demand for capacity and the broader use and congestion of the electromagnetic spectrum are among the forces increasing the complexity, cost, and performance requirements of analog systems. As higher levels of performance and higher carrier frequencies become desired, especially in the millimeter wave portion of the spectrum, new approaches may be desirable to meet the challenges. Photonics offers certain advantages in this regard: bandwidth; size, weight and power (SWaP); linearity; frequency agility; and providing a reconfigurable infrastructure for analog signal processing.

Photonic systems may cover a wide frequency range and instantaneous bandwidth (IBW), with frequency ranges extending to millimeter waves and an IBW as large as 4 GHz or more. Optical fiber provides an exceptionally low loss transmission medium, with roughly 0.2 dB/km loss regardless of the analog frequency it is carrying. Wavelength division multiplexing may further extend bandwidth by allowing multiple signals to share the same path.

The SWaP of a photonic system may be relatively low due in part to the wide bandwidth of the system: a single set of hardware may cover many decades of the RF spectrum. Optical fiber is also substantially lighter in weight than coaxial cable, and its inherent immunity to electromagnetic interference reduces the cost, effort and space desired for shielding.

As with RF signal processing, it may be desired in some applications to perform filtering in the photonic domain as well. One approach to filtering in the photonic domain involves ring waveguides or resonators. An optical ring resonator is a closed loop waveguide coupled to an optical input and output. As a result of constructive interference within the ring, only certain frequencies of light will be at resonance within the ring and therefore pass to the output. As a result, the optical ring resonator acts as a filter for these wavelengths of light.

In some configurations, more than one ring resonator may be connected in series. An example of such a configuration is set forth in U.S. Pat. No. 6,411,752 to Little et al. This patent discloses a device in which optical resonators are vertically coupled on top of bus waveguides, and are separated from the waveguides by a buffer layer of arbitrary thickness.

Despite the existence of such configurations, further enhancements may be desirable with respect to optical filters to provide a desired filter response in certain applications.

SUMMARY

A communications system may include a radio frequency (RF) input configured to receive an RF input signal, an RF to photonic converter coupled to the RF input and configured to generate an optical input signal based upon the RF input signal, and an optical filter device. The optical filter device may include an optical waveguide having an input configured to receive the optical input signal from the RF to photonic converter and an output configured to output a filtered optical signal, a plurality of first optical resonators optically coupled to the optical waveguide along a length thereof between the input and the output, and at least one second optical resonator optically coupled to the plurality of first optical resonators opposite the optical waveguide. The system may further include a photonic to RF converter coupled to the output of the optical waveguide and configured to generate a filtered RF output signal based upon the filtered optical signal, and an RF output configured to output the filtered RF output signal. The optical filter arrangement may advantageously enable increased frequency selectivity/rejection, as well as improved performance using cross-coupling for the same number of resonators as traditional, linear arranged filters, for example.

More particularly, the optical filter device may further include a mechanical actuator configured to adjust a spacing between the plurality of first optical resonators and the at least one second optical resonator, and a controller coupled to the mechanical actuator to change a tuning of the optical filter device. In accordance with another example embodiment, the optical filter device may further include at least one electrical conductor configured to adjust an electrical field in at least one of the plurality of first optical resonators and the at least one second optical resonator, and a controller coupled to the at least one electrical conductor to change a tuning of the optical filter device.

In still another example embodiment, the optical filter may further include a heating element configured to adjust a temperature of at least one of the plurality of first optical resonators and the at least one second optical resonator, and a controller coupled to the heating element to change a tuning of the optical filter device. The optical filter device may also include a vacuum housing containing the optical waveguide, the plurality of first optical resonators, and the at least one second optical resonator.

By way of example, the plurality of first optical resonators and the at least one second optical resonator may comprise ring resonators. The at least one second optical resonator may have a different diameter than each of the plurality of first optical resonators. Furthermore, the optical waveguide may comprise a linear segment optical waveguide. In addition, the plurality of first optical resonators may comprise a pair of optical resonators. By way of example, the optical waveguide, plurality of first optical resonators, and at least one second optical resonator may be sized to operate in a wavelength range of 850 nanometers to 1550 nanometers.

A related method may include receiving an RF input signal at an RF input, generating an optical input signal based upon the RF input signal using an RF to photonic converter coupled to the RF input, and optically filtering the optical input signal to generate a filtered optical signal using an optical filter device, such as the one described briefly above. The method may further include generating a filtered RF output signal based upon the filtered optical signal using a photonic to RF converter coupled to the output of the optical waveguide, and outputting the filtered RF output signal from an RF output.

A related optical filter device, such as the one described briefly above, and method of filtering an optical input signal are also provided. The method may include inputting the optical input signal to the optical filter device including an optical waveguide having an input configured to receive the optical input signal and an output configured to output a filtered optical signal, a plurality of first optical resonators optically coupled to the optical waveguide along a length thereof between the input and the output, and at least one second optical resonator optically coupled to the plurality of first optical resonators opposite the optical waveguide. The method may further include outputting the filtered optical signal from the output of the optical waveguide.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
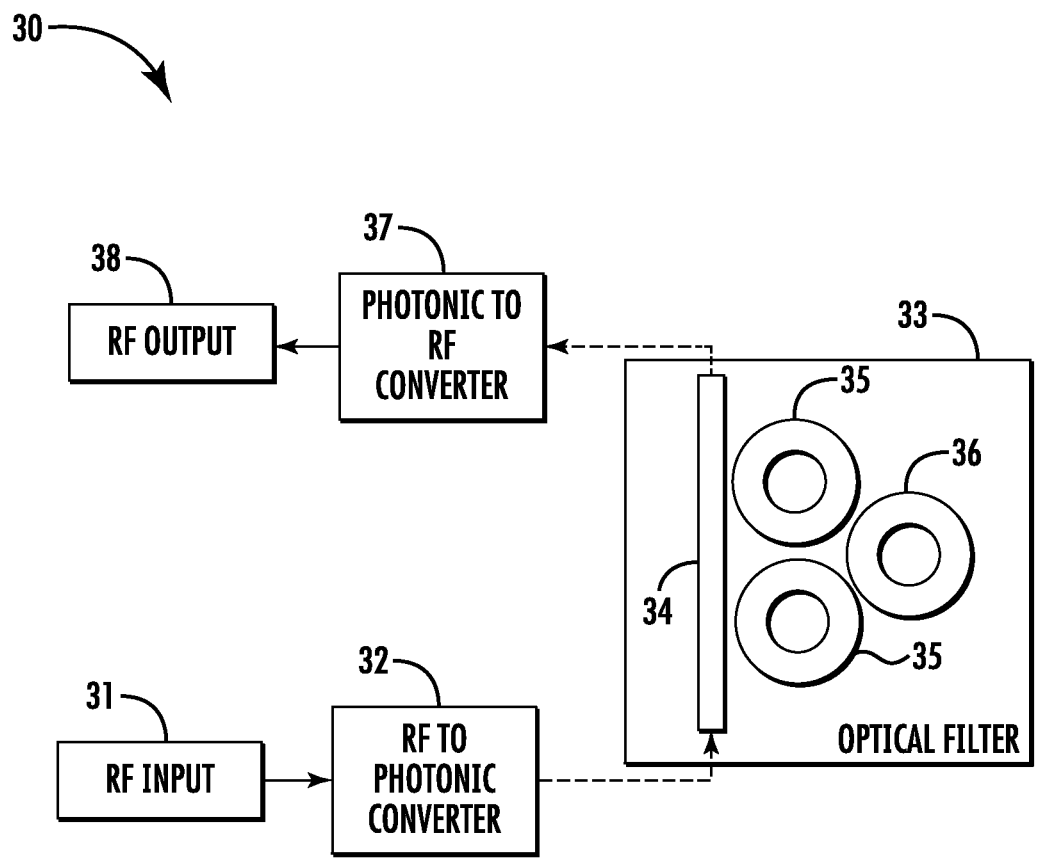
FIG. 1 is a schematic block diagram of a communications system including an optical filter in accordance with an example embodiment.

Referring initially to FIG. 1, a communications system 30 is first described. The system 30 illustratively includes a radio frequency (RF) input 31 configured to receive an RF input signal (e.g., from an antenna, which is not shown in FIG. 1), and an RF to photonic converter 32 coupled to the RF input and configured to generate an optical input signal based upon the RF input signal. For example, the RF to photonic converter 32 may include a laser and an optical modulator that modulates laser light based upon the RF input signal. An output of the RF to photonic converter 32 is provided to an optical filter device 33. In the embodiment illustrated in FIG. 1, RF signals are indicated by solid line arrows, while photonic signals are illustrated by dashed line arrows.

The optical filter device 33 illustratively includes an optical waveguide 34 having an input configured to receive the optical input signal from the RF to photonic converter 32, and an output configured to output a filtered optical signal. In the illustrated example, the optical waveguide 34 is a linear segment optical waveguide, although other suitable waveguide configurations may be used in different embodiments.

The optical filter device 33 further illustratively includes a plurality of first optical resonators, and one or more second optical resonators. More particularly, in the illustrated example, the first optical resonators comprise first optical ring resonators 35 optically coupled to the optical waveguide 34 along a length thereof between the input and the output, and the second optical resonator comprises a second optical ring resonator 36 optically cross-coupled to the plurality of first optical ring resonators opposite the optical waveguide, as will be discussed further below, and ring resonators will be used in the discussion of the example embodiments herein. By way of example, the ring resonators 35, 36 may be micro-ring resonators in some embodiments. However, it should be noted that other optical resonators may be used, such a disk resonators, for example (e.g., resembling a continuous "puck" shape as opposed to a "donut" shape with a hole in the center). The system 30 also illustratively includes a photonic to RF converter 37 coupled to the output of the optical waveguide 34 and configured to generate a filtered RF output signal based upon the filtered optical signal, and an RF output 38 configured to output the filtered RF output signal.

Figure 2:
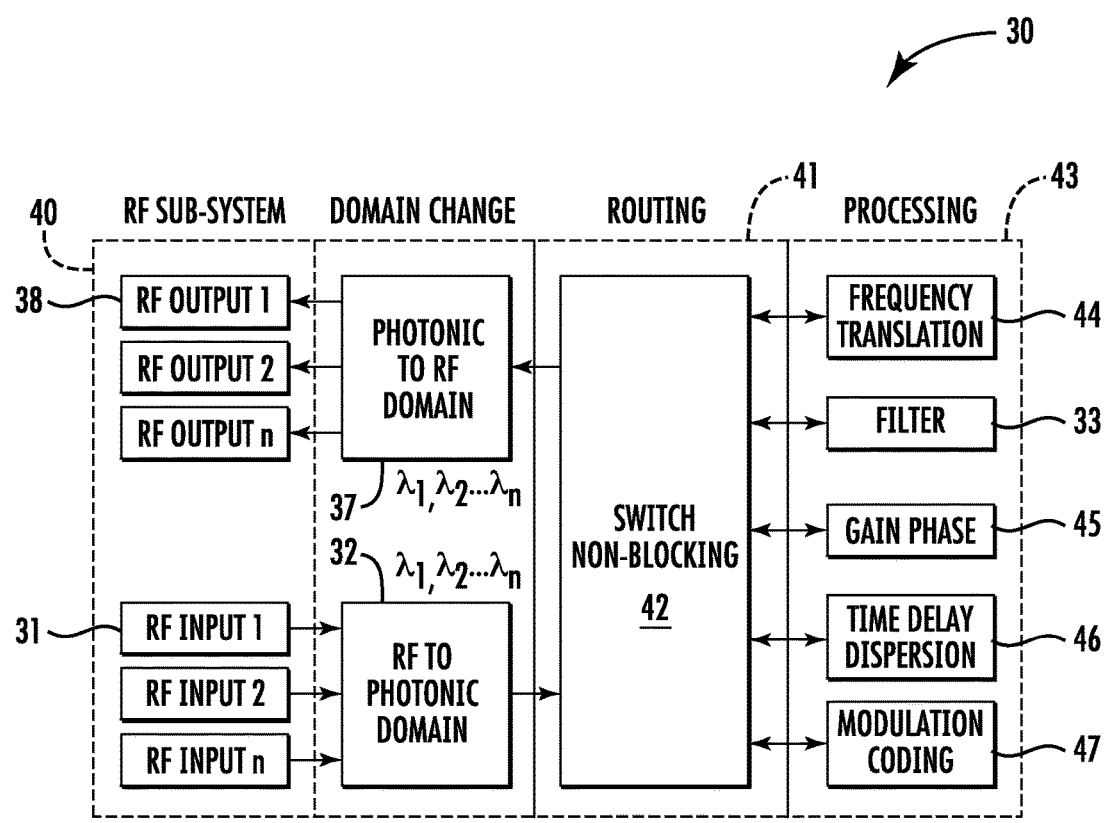
FIG. 2 is a schematic block diagram of an example implementation of the communications system of FIG. 1 in greater detail.

In accordance with another example embodiment now described with reference to FIG. 2, the system 30 further illustratively includes a plurality of RF inputs 31 and outputs 38 in an RF sub-system 40. A routing sub-system 41 illustratively includes a non-blocking optical switch array 42 coupled to the RF to photonic converter 32 and the photonic to RF converter 37. Furthermore, the optical filter 33 may be incorporated within a processing sub-system 43 which further illustratively includes a frequency translation module 44, gain/phase module 45, time delay dispersion module 46, and modulation coding module 47 all coupled to the non-blocking optical switch array 42. By way of example, one or more of the modules 44-47 may be implemented using a combination of hardware (e.g., microprocessor, etc.) and a non-transitory computer-readable medium having computer-executable instructions for performing the various operations associated therewith.

In accordance with one example implementation, RF signals from 1 MHz to 100 GHz may be applied to respective RF inputs 31. At this point, each signal is converted to an optical signal in the wavelength region of 850 nm to 1500 nm by the RF to photonic converter 32 and are directed to the processing sub-system 43 through the non-blocking optical switch array 42. However, it should be noted that other operating frequency ranges may be used in different embodiments. As such, the system 30 may advantageously be used for applications such as satellite communication, radar or other RF signal processing, as well as optical communications links, for example.

When the appropriate switches are operated, the optical signals arrive at the processing sub-system 43 where processing by one or more of the optical filter 33 and modules 44-47 takes place. As an example, if filtering is required then the switches are set for a given RF input signal to arrive at the optical filter 33. When filtering is complete, the signal may be redirected back to the non-blocking optical switch array 42, which then directs the signal to be converted back to the RF domain by the photonic to RF conference 37. The signal may then be directed to one or more of the RF outputs 38.

Figure 3:
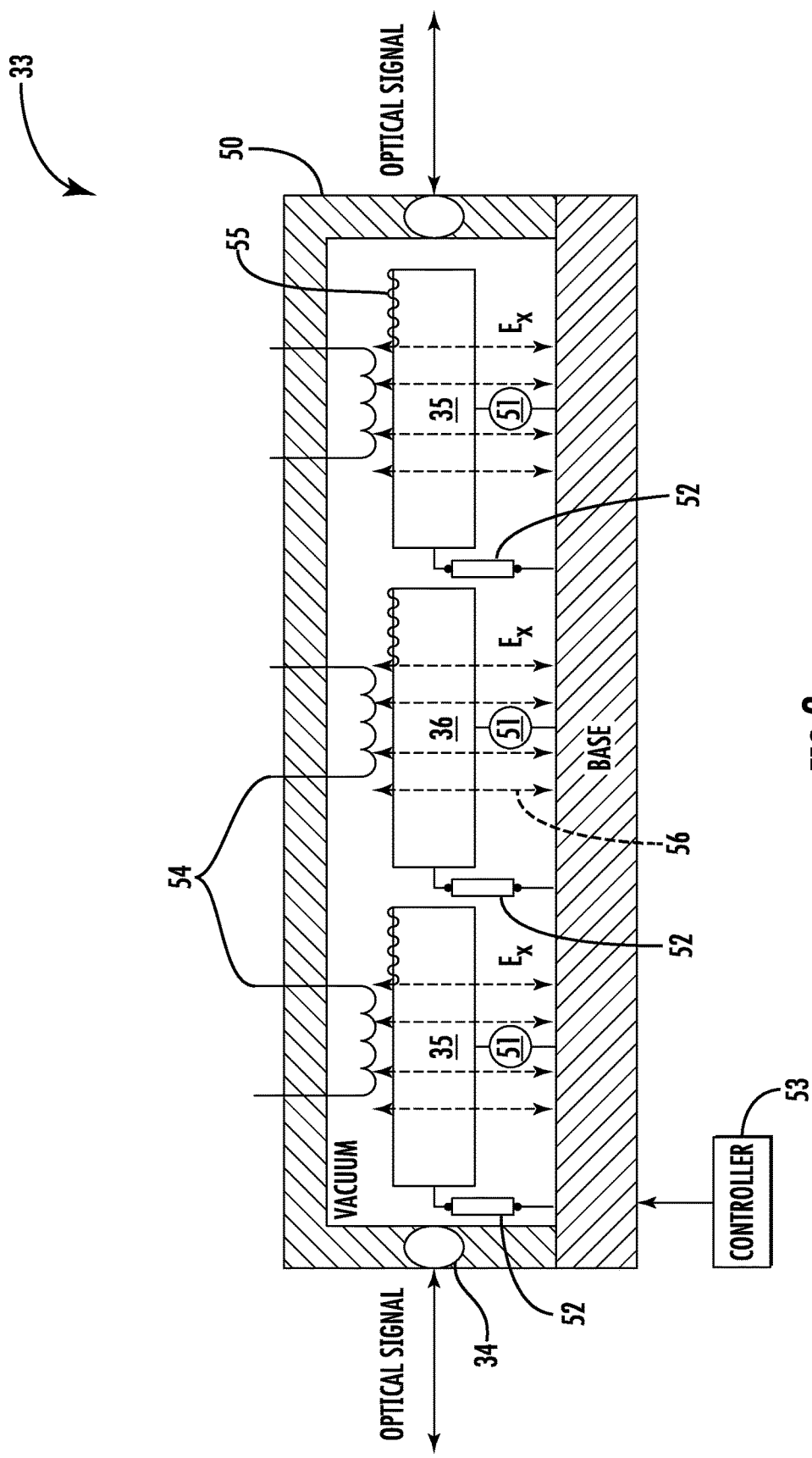
FIG. 3 is a schematic diagram of an example arrangement of the optical filter of the communications system of FIG. 1.

Turning now to FIG. 3, in an example embodiment the optical filter device 33 illustratively includes a vacuum housing 50 containing the optical waveguide 34, the plurality of first optical ring resonators 35, and the second optical ring resonator 36. The vacuum housing 50 advantageously helps eliminate air currents and temperature variations among the first and second ring resonators 35, 36. Furthermore, thermal and/or mechanical isolators 51 may be provided within the vacuum housing 50 for each ring resonator 35, 36. Moreover, in some embodiments, various reconfiguring mechanisms may be used to advantageously change or adjust a tuning of the optical filter device 33.

More particularly, one or more mechanical actuators 52 (e.g., MEMS devices, etc.) may be provided to adjust a spacing between the plurality of first optical ring resonators 35 and the second optical ring resonator(s) 36 based upon a controller 53. Here again, the controller 53 may be implemented using appropriate hardware (e.g., microprocessor, etc.) and a non-transitory computer readable medium having computer executable instructions for causing the mechanical actuator(s) 51 (or other tuning mechanism discussed below) to change a tuning of the optical filter device 33.

Furthermore, the optical filter device 33 further illustratively includes one or more electrical conductors 54 configured to adjust an electrical field in at least one of the plurality of first optical ring resonators 35 and the second optical ring resonator(s) 36 based upon the controller 53 to thereby change a tuning of the optical filter device. In the illustrated example, the electrical fields $E_x$ from the conductors 54 are represented by vertical dashed arrows 56.

In addition, the optical filter device 33 further illustratively includes one or more heating elements 55 configured to adjust a temperature of at least one of the plurality of first optical ring resonators 35 and the second optical ring resonator(s) 36 based upon the controller 53 to change a tuning of the optical filter device 33. It should be noted that one or more of the above-described tuning features may be used in different embodiments (i.e., not all of them have to be included in all embodiments), and in some embodiments there may be no tuning features. Moreover, a given tuning feature may be associated with one or more of the ring resonators 35, 36 (i.e., not all of the ring resonators need to have a respective tuning feature associated therewith in different embodiments).

Figure 4:
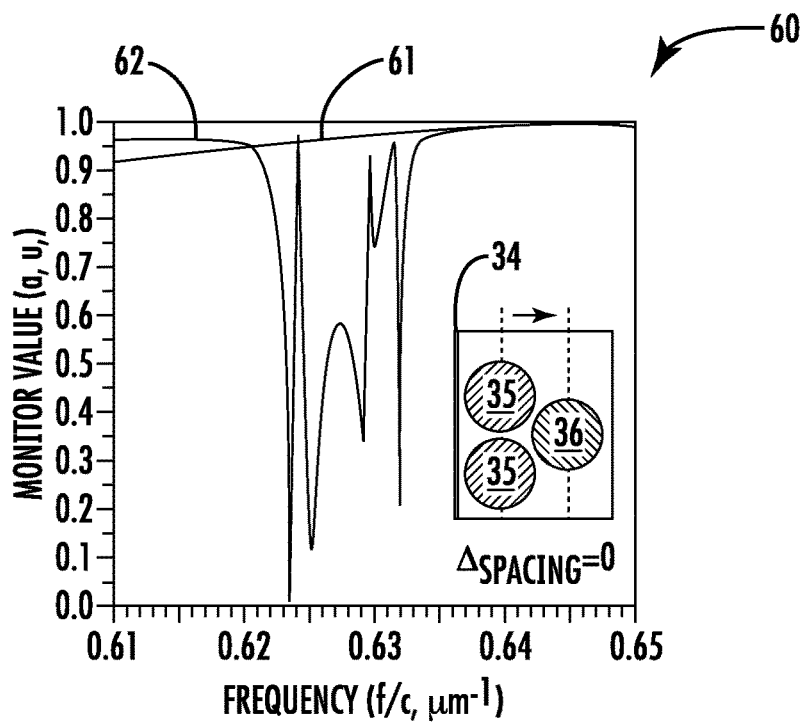
FIGS. 4-6 are schematic block diagrams of the optical filter of FIG. 1 with three different optical ring resonator gap spacings, and respective graphs of the associated filter responses based thereon.
Figure 5:
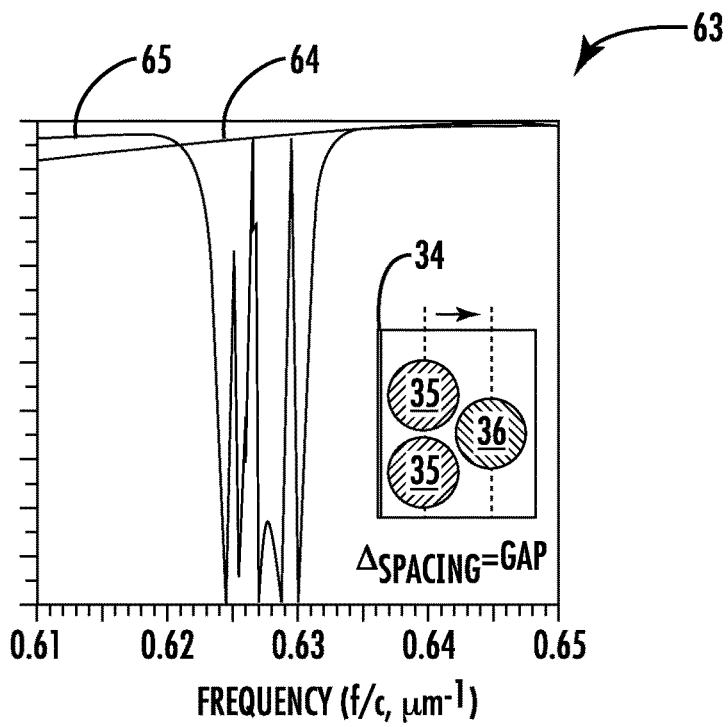
Figure 6:
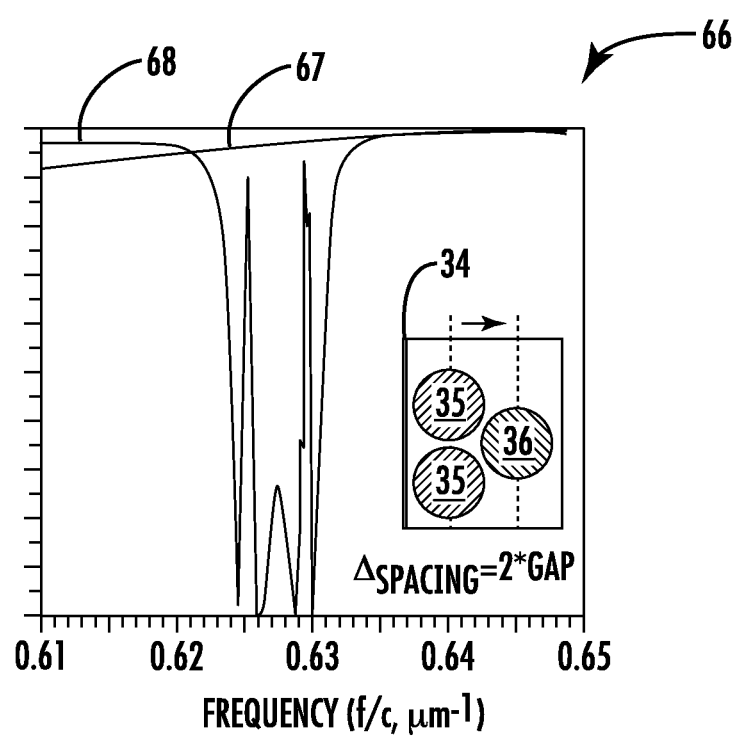
Figure 7A:
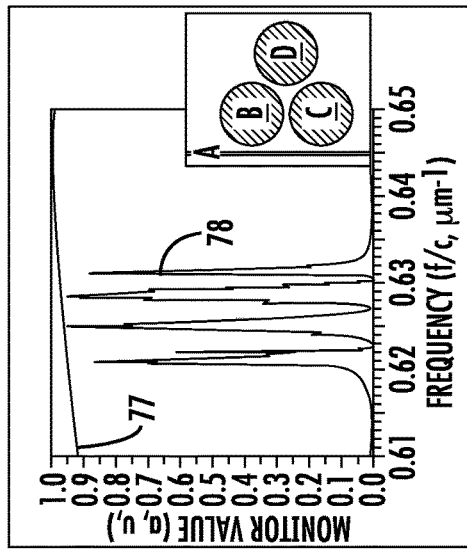
FIGS. 7(a)-7(f) are a series of schematic block diagrams of the optical filter of FIG. 1 with different optical ring resonator size configurations, and respective graphs of the associated filter responses based thereon.
Figure 7B:
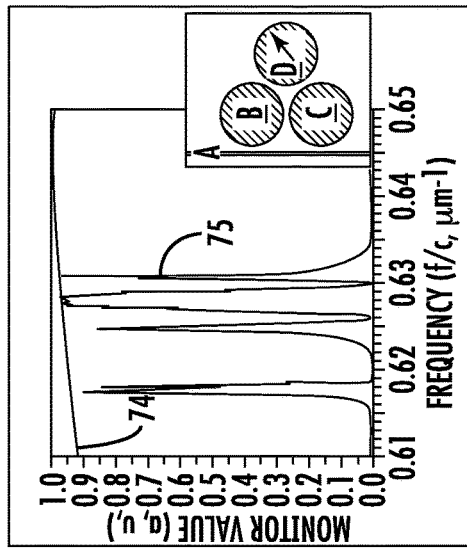
Figure 7C:
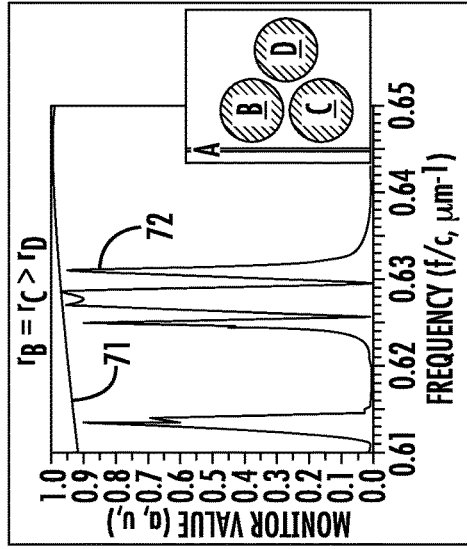
Figure 7D:
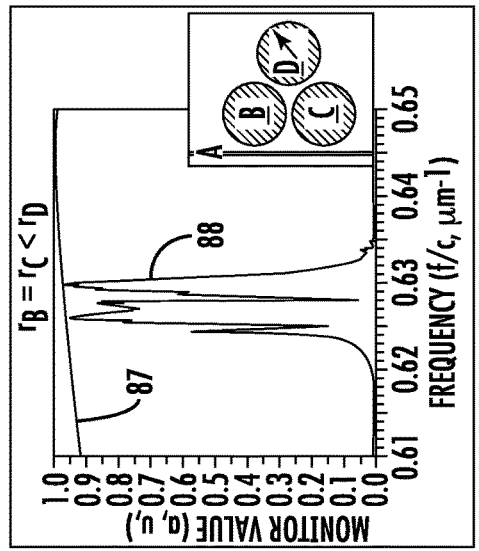
Figure 7E:
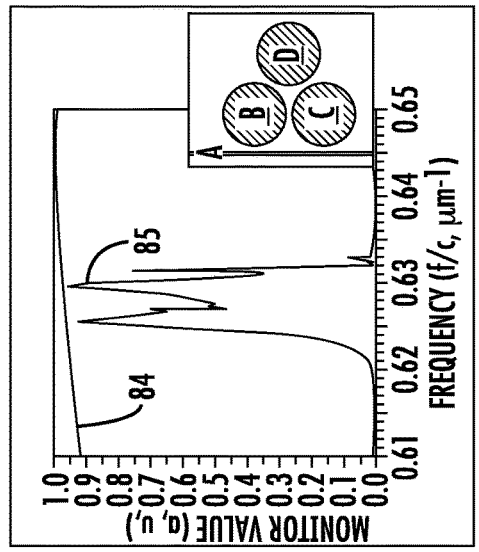
Figure 7F:
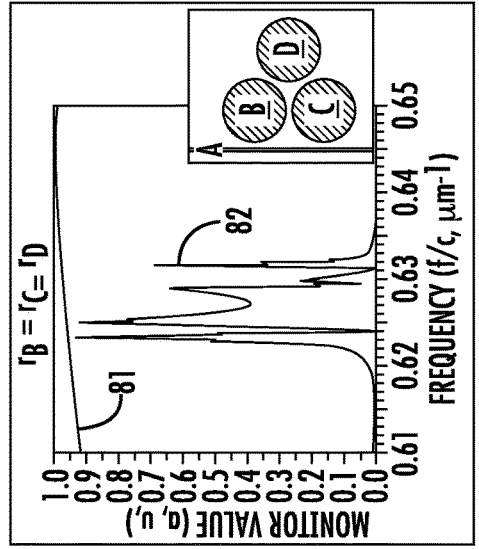

Referring additionally to FIGS. 4-6, an example of how mechanical actuation may be used to change the tuning of the optical filter device 33 is now described. In the first example illustrated in the graph 60 of monitor value vs. frequency, the second ring resonator 36 is directly coupled to the first ring resonators 35 (i.e., the gap between them is equal to zero). Here, the source signal is represented by the plot line 61, and the filtered signal is represented by the plot line 62.

In the example illustrated in the graph 61 of FIG. 5, the second ring resonator 36 is spaced apart from the first ring resonators 35 by one unit or gap length, which in the present example is equal to 0.2 microns. Here, the source signal is represented by the plot line 64, and the filtered signal is represented by the plot line 65. Furthermore, in the example illustrated in the graph 66 of FIG. 6, the second ring resonator 36 is spaced apart from the first ring resonators 35 by two units or gap lengths, which in the present example is equal to 0.4 microns. Here, the source signal is represented by the plot line 67, and the filtered signal is represented by the plot line 68.

Thus, by moving the first ring resonators 35 and second ring resonator 36 relative to one another, for example via the mechanical actuator(s) 52, the tuning of the optical filter device 33 may accordingly be changed. Similarly, incremental changes in the energy field $E_x$ and/or temperature may also be used to adjust or change the tuning of the optical filter device 33.

Turning now to FIGS. 7(a)-(e), another mechanical approach for changing the tuning of the optical filter device 33 involves changing the dimensions (i.e., the radius) of one or more of the first and second ring resonators 35, 36. In the illustrated example, for convenience of reference the optical waveguide 34 is labeled as element A, the first ring resonators 35 are labeled as elements B and C, and the second ring resonator 36 is labeled as element D, so that radiuses of the ring resonators are given by $r_B$, $r_C$, $r_C$, respectively. In the graph FIG. 7(a), the source signal is represented by the plot line 71, and the filtered signal is represented by the plot line 72, and here the radiuses $r_B$ and $r_C$ are the same, while the radius $r_D$ is smaller than the radiuses $r_B$ and $r_C$.

The radius $r_C$ increases in size sequentially through the examples of FIGS. 7(b)-7(f). In the graph 73 FIG. 7(b), the source signal is represented by the plot line 71, and the filtered signal is represented by the plot line 72. In the graph 76 FIG. 7(c), the source signal is represented by the plot line 77, and the filtered signal is represented by the plot line 78. In the graph 80 of FIG. 7(d), the source signal is represented by the plot line 81, and the filtered signal is represented by the plot line 82. Moreover, here all three of the radiuses $r_B$, $r_C$, $r_C$ are equal. In the graph 83 FIG. 7(e), the source signal is represented by the plot line 84, and the filtered signal is represented by the plot line 85. In the graph 86 FIG. 7(f), the source signal is represented by the plot line 87, and the filtered signal is represented by the plot line 88. Thus, these example implementations demonstrate that sizes of the ring resonators 35, 36 may advantageously be selected to provide the desired tuning. It should be noted that the sizes of one or more of the first ring resonators 35 may also be changed in some embodiments, and that they need not always have the same size in all embodiments. From the filtered signal responses shown in FIGS. 7(a)-7(f), it will be appreciate that a desired separation of reflection peaks into multiple bands, along with frequency selectivity, may be achieved with the optical filter 33.

Figure 8:
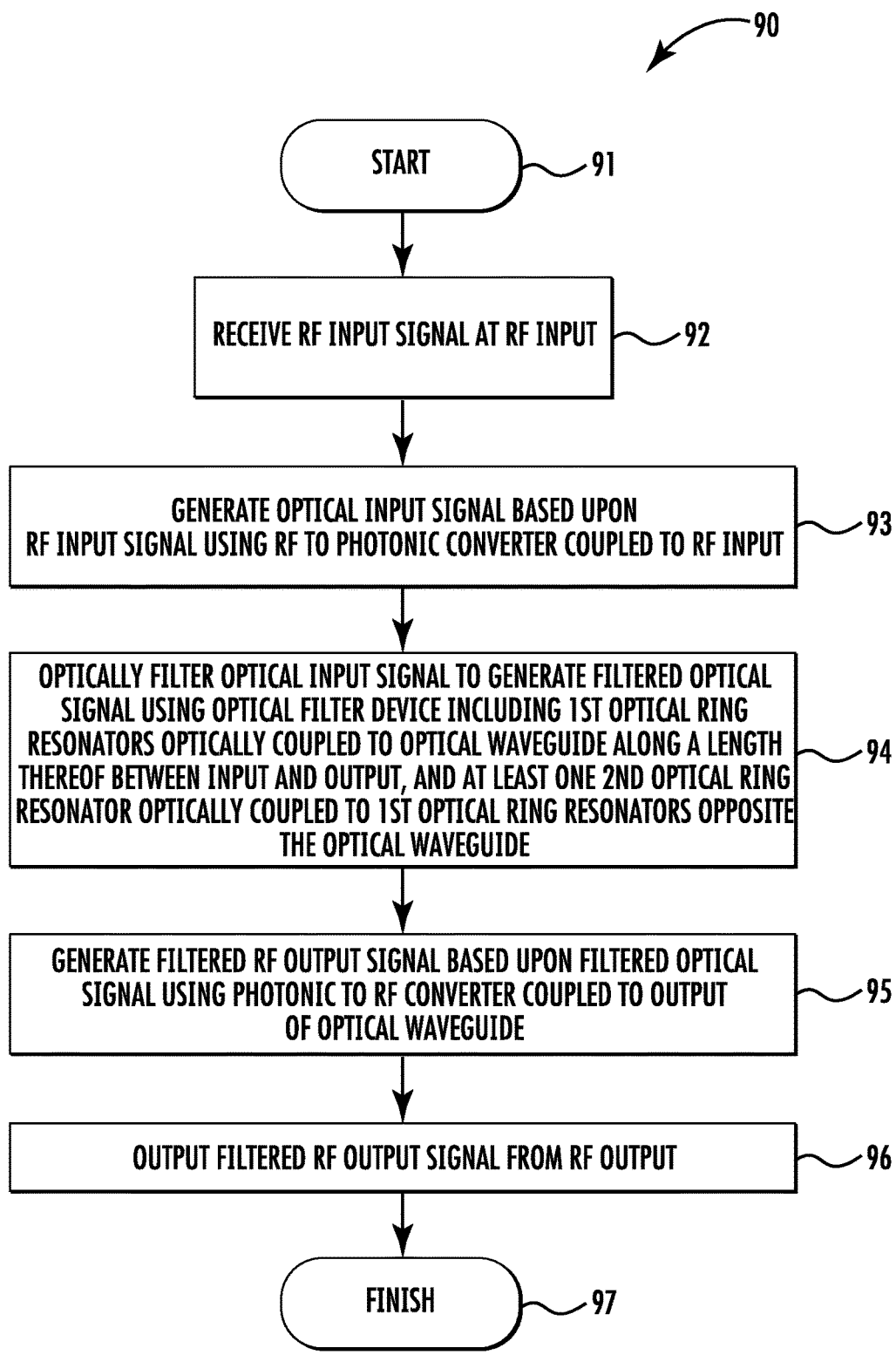
FIG. 8 is a flow diagram illustrating method aspects associated with the system of FIG. 1.

A related method is now described with reference to the flow diagram 90 of FIG. 8. Beginning at Block 91, an RF input signal is received at the RF input 31, and an optical input signal is generated based upon the RF input signal using the RF to photonic converter 32 coupled to the RF input, at Block 93, as discussed further above. The method further illustratively includes optically filtering the optical input signal to generate a filtered optical signal using the optical filter device 33, at Block 94, as also discussed further above. The method may further include generating a filtered RF output signal based upon the filtered optical signal using the photonic to RF converter 37 coupled to the output of the optical waveguide 34, at Block 95, and outputting the filtered RF output signal from the RF output 38, at Block 96, as discussed further above. The method of FIG. 8 illustratively concludes at Block 97.

From the foregoing, it will be appreciated that the cross-coupled ring resonator configuration of the optical filter 33 advantageously enables increased frequency selectivity/rejection, as well as improved performance using cross-coupling for the same number of resonators as traditional, linear arranged filters. This configuration may also advantageously provide for the availability of multiple highly selective frequency bands, as well as bandwidth and frequency selectivity. Furthermore, the cross-coupled ring resonator filter configuration set forth herein may advantageously provide one or more of the following advantages with respect to conventional filter arrangements: relatively higher stability; relatively easier to manufacture; fewer parts to fabricate; fewer control elements; reduced size; and/or reduced insertion loss.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A communications system comprising:
  a radio frequency (RF) input configured to receive an RF input signal;
  an RF to photonic converter coupled to said RF input and configured to generate an optical input signal based upon the RF input signal;
  an optical filter device comprising
    an optical waveguide having an input configured to receive the optical input signal from said RF to photonic converter, and an output configured to output a filtered optical signal,
    a plurality of first optical resonators each having a first side optically coupled to the optical waveguide along a length thereof between the input and the output, with adjacent first optical resonators being directly coupled to one another, the first optical resonators also each having a second side opposite the first side, and
    at least one second optical resonator optically coupled to the second sides of the plurality of first optical resonators;
  a photonic to RF converter coupled to the output of said optical waveguide and configured to generate a filtered RF output signal based upon the filtered optical signal; and
  an RF output configured to output the filtered RF output signal.

2. The communications system of claim 1 wherein said optical filter device further comprises:
  a mechanical actuator configured to adjust a spacing between said plurality of first optical resonators and said at least one second optical resonator; and
  a controller coupled to said mechanical actuator to change a tuning of the optical filter device.

3. The communications system of claim 1 wherein said optical filter device further comprises:
  at least one electrical conductor configured to adjust an electrical field in at least one of said plurality of first optical resonators and said at least one second optical resonator; and
  a controller coupled to said at least one electrical conductor to change a tuning of the optical filter device.

4. The communications system of claim 1 wherein said optical filter device further comprises:
  a heating element configured to adjust a temperature of at least one of said plurality of first optical resonators and said at least one second optical resonator; and
  a controller coupled to said heating element to change a tuning of the optical filter device.

5. The communications system of claim 1 wherein said optical filter device further comprises a vacuum housing containing said optical waveguide, said plurality of first optical resonators, and said at least one second optical resonator.

6. The communications system of claim 1 wherein said at least one second optical resonator has a different diameter than each of the plurality of first optical resonators.

7. The communications system of claim 1 wherein said optical waveguide comprises a linear segment optical waveguide.

8. The communications system of claim 1 wherein the plurality of first optical resonators comprises a pair of optical resonators.

9. The communications system of claim 1 wherein the optical waveguide, plurality of first optical resonators, and at least one second optical resonator are sized to operate in a wavelength range of 850 nanometers to 1550 nanometers.

10. The communications system of claim 1 wherein said plurality of first optical resonators and the at least one second optical resonator comprise ring resonators.

11. An optical filter device comprising:
  an optical waveguide having an input and an output;
  a plurality of first optical resonators each having a first side optically coupled to the optical waveguide along a length thereof between the input and the output, with adjacent first optical resonators being directly coupled to one another, the first optical resonators also each having a second side opposite the first side; and
  at least one second optical resonator optically coupled to the second sides of the plurality of first optical resonators.

12. The optical filter device of claim 11 further comprising:
  a mechanical actuator configured to adjust a spacing between said plurality of first optical resonators and said at least one second optical resonator; and
  a controller coupled to said mechanical actuator to change a tuning of the optical filter device.

13. The optical filter device of claim 11 further comprising:
  at least one electrical conductor configured to adjust an electrical field in at least one of said plurality of first optical resonators and said at least one second optical resonator; and
  a controller coupled to said at least one electrical conductor to change a tuning of the optical filter device.

14. The optical filter device of claim 11 further comprising:
  a heating element configured to adjust a temperature of at least one of said plurality of first optical resonators and said at least one second optical resonator; and
  a controller coupled to said heating element to change a tuning of the optical filter device.

15. The optical filter device of claim 11 further wherein the plurality of first optical resonators and the at least one second optical resonator comprise ring resonators.

16. A method comprising:
  receiving a radio frequency (RF) input signal at an RF input;
  generating an optical input signal based upon the RF input signal using an RF to photonic converter coupled to the RF input;
  optically filtering the optical input signal to generate a filtered optical signal using an optical filter device comprising
    an optical waveguide having an input configured to receive the optical input signal from the RF to photonic converter, and an output configured to output the filtered optical signal, a plurality of first optical resonators each having a first side optically coupled to the optical waveguide along a length thereof between the input and the output, with adjacent first optical resonators being directly coupled to one another, the first optical resonators also each having a second side opposite the first side, and at least one second optical resonator optically coupled to the second sides of the plurality of first optical resonators;

generating a filtered RF output signal based upon the filtered optical signal using a photonic to RF converter coupled to the output of the optical waveguide; and outputting the filtered RF output signal from an RF output.

17. The method of claim 16 wherein the optical filter device further comprises a mechanical actuator; and further comprising using the mechanical actuator to adjust a spacing between the plurality of first optical resonators and the at least one second optical resonator to change a tuning of the optical filter device.

18. The method of claim 16 wherein the optical filter device further comprises at least one electrical conductor; and further comprising using the at least one electrical conductor to adjust an electrical field in at least one of the plurality of first optical resonators and the at least one second optical resonator to change a tuning of the optical filter device.

19. The method of claim 16 wherein the optical filter device further comprises a heating element; and further comprising using the heating element to adjust a temperature of at least one of the plurality of first optical resonators and the at least one second optical resonator to change a tuning of the optical filter device.

20. The method of claim 16 wherein the plurality of first optical resonators and the at least one second optical resonator comprise ring resonators.

21. A method of filtering an optical input signal comprising:

inputting the optical input signal to an optical filter device comprising an optical waveguide having an input configured to receive the optical input signal, and an output configured to output a filtered optical signal, a plurality of first optical resonators each having a first side optically coupled to the optical waveguide along a length thereof between the input and the output, with adjacent first optical resonators being directly coupled to one another, the first optical resonators also each having a second side opposite the first side, and at least one second optical resonator optically coupled to the second sides of the plurality of first optical resonators; and outputting the filtered optical signal from the output of the optical waveguide.

22. The method of claim 21 wherein the optical filter device further comprises a mechanical actuator; and further comprising using the mechanical actuator to adjust a spacing between the plurality of first optical resonators and the at least one second optical resonator to change a tuning of the optical filter device.

23. The method of claim 21 wherein the optical filter device further comprises at least one electrical conductor; and further comprising using the at least one electrical conductor to adjust an electrical field in at least one of the plurality of first optical resonators and the at least one second optical resonator to change a tuning of the optical filter device.

24. The method of claim 21 wherein the optical filter device further comprises a heating element; and further comprising using the heating element to adjust a temperature of at least one of the plurality of first optical resonators and the at least one second optical resonator to change a tuning of the optical filter device.

25. The method of claim 21 wherein the plurality of first optical resonators and the at least one second optical resonator comprise ring resonators.

* * * * *